INVENTOR
Gerald C. Roinestad

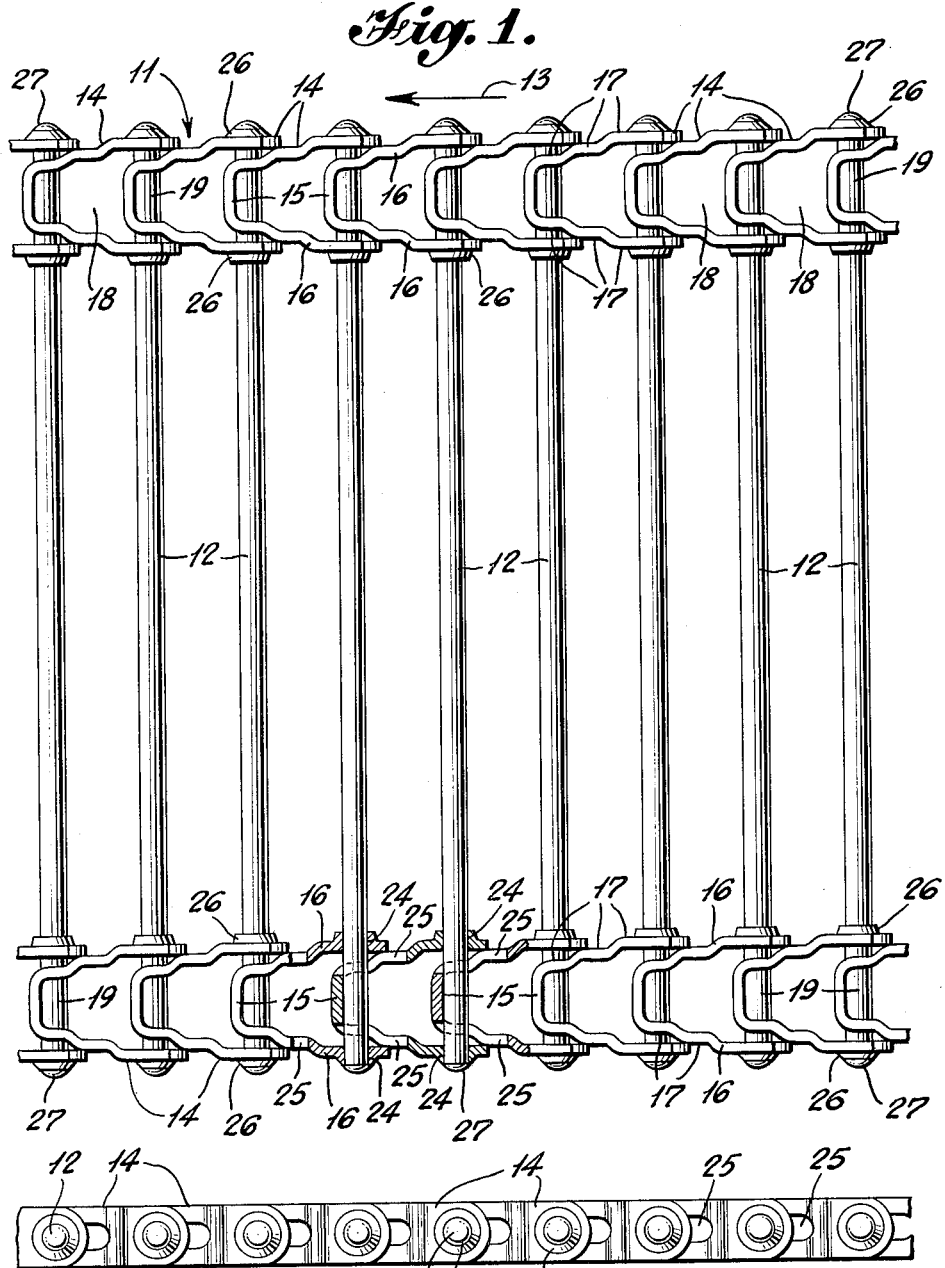

United States Patent Office 3,225,898
Patented Dec. 28, 1965

3,225,898
COLLAPSIBLE CONVEYOR BELT
Gerald C. Roinestad, Winchester, Va., assignor to Ashworth Bros. Inc., Winchester, Va., a corporation of Massachusetts
Filed Feb. 26, 1964, Ser. No. 347,531
5 Claims. (Cl. 198—181)

This invention relates to conveyor belts and more particularly to collapsible conveyor belts of openwork construction capable of movement through both a horizontally curved and a straight path.

Conveyor belt systems are widely used in a great variety of industrial fields. In many installations it is desirable to utilize a belt in which the conveying surface is formed by spaced rods without complex metallic fabric between the rods. Typically the rods are connected only by a single row of narrow links on the extreme edges of the belt. For example, such belts have found considerable application in the handling of food such as bread and other bakery products. Freshly baked goods are often conveyed from the ovens to a wrapping station and remain in transit for a sufficient period to permit the goods to cool to a degree that a wrapper may be applied. The spaced rod conveying surface is sanitary and easy to clean. It also permits a maximum amount of air to circulate around the goods to facilitate cooling.

A difficult problem is presented in constructing the spaced rod type of belt for use around horizontal curves. In such a construction the sides of the belt must be longitudinally collapsible. In heretofore available conveyor belts of this type the requisite collapsibility has been accompanied by a lack of lateral stability which has been disadvantageous.

To overcome the disadvantages of the prior art, it is an object of the present invention to provide an improved conveyor belt having a spaced rod conveying surface, which belt is capable of movement along straight lines and around horizontal curves.

Another object of the invention is to provide such a belt having a plurality of transverse rods and stepped connecting links which permit the belt to be readily collapsible and flexible while still possessing considerable strength and lateral stability.

A further object of the invention is to provide such a belt which is relatively simple to construct and maintain and yet study in construction.

A still further object of the invention is to provide such a belt which is easy to clean, thus permitting sanitary operation when employed to transport food products and the like.

In general the invention includes a conveyor belt comprising a plurality of spaced rods extending transversely of the path of movement of said belt, a plurality of connecting links disposed in a pair of spaced rows at the opposite ends of said rods, said links slidably interconnecting said rods to permit the collapse of either side of the belt during travel around horizontal curves, each of said links having a base portion and a pair of spaced legs rigidly connected to the outer ends of said base portion, each of said legs having a plurality of stepped portions parallel to said path, the stepped portions on opposing legs being spaced apart a relatively narrow distance at said base portion and a relatively wide distance at the opposite end thereof, said links being arranged in a partially nested relation with narrower stepped portions of respective ones of said links being received in closely fitting sliding relation within the wider stepped portions of adjoining links, and means to retain said links against lateral displacement relative to said rods.

The invention having been broadly described, a specific embodiment thereof will now be set forth in detail with reference to the accompanying drawings in which:

FIGURE 1 is a plan view of a portion of a conveyor belt according to the invention with some of the connecting links being shown in section;

FIGURE 2 is a side elevation of the conveyor belt shown in FIGURE 1;

Illustrated in FIGURE 1 of the drawings is a conveyor belt 11 which comprises a plurality of rods 12 extending transversely of the path of movement of the belt. The belt preferably is driven in the direction of arrow 13, although it will be understood that, if desired, the belt also may be driven in the opposite direction. The rods 12 may be positioned at spaced locations along the length of the belt. As shown in FIGURE 1, the rods 12 are in generally parallel relation when the belt is traveling in a straight path. When the belt is traveling in a horizontally curved path, however, the ends of the rods on the inside of the curve are more closely spaced than the ends of the rods on the outside of the curve as will be more fully described hereinafter in connection with FIGURE 3.

Figure 3:
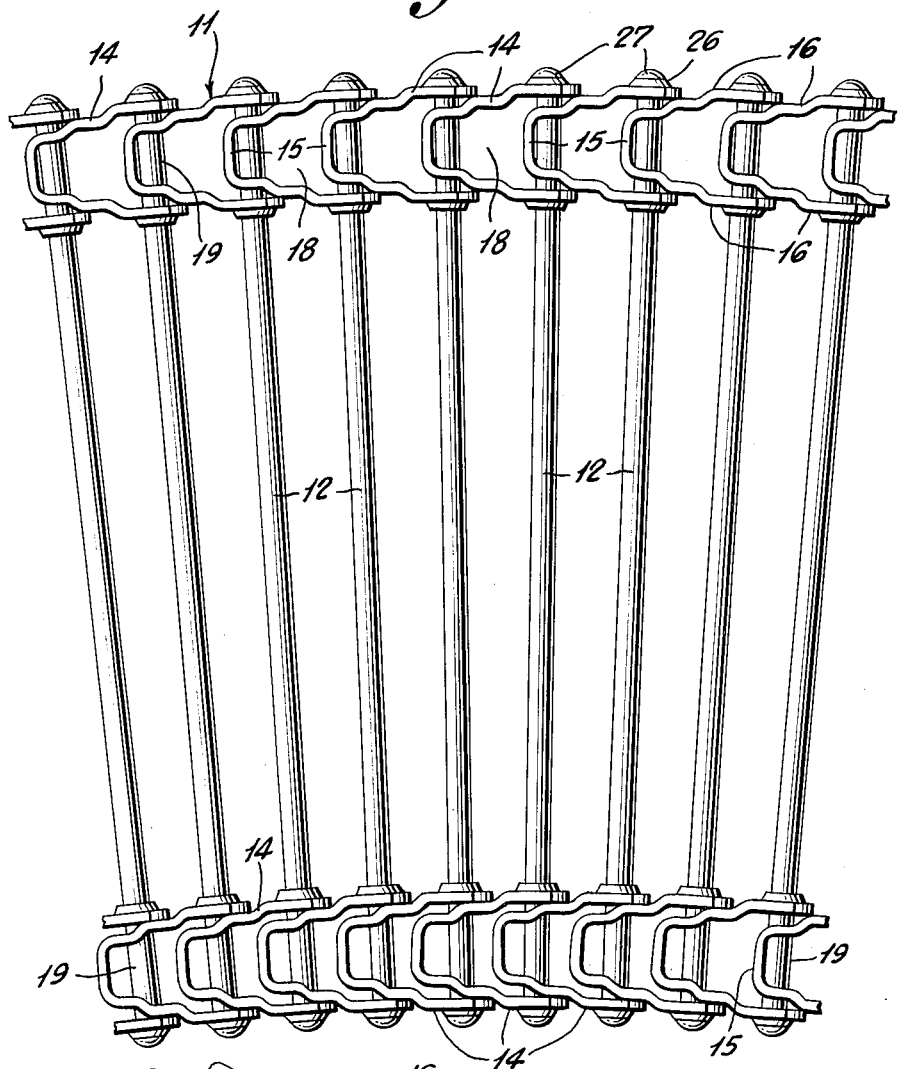
FIGURE 3 is a plan view showing the conveyor belt of FIGURE 1 partially collapsed in its movement through a horizontally curved path.
Figure 4:
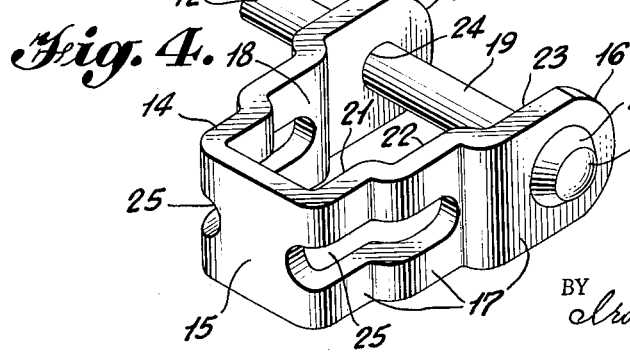
FIGURE 4 is an enlarged perspective view of one of the connecting links.

The rods 12 are slidably interconnected at their ends by a plurality of generally U-shaped stepped connecting links 14 arranged in a pair of spaced rows at opposite ends of the rod. Each of the links is comprised of a straight base portion 15 having a pair of legs 16 rigidly connected to its outer ends thereof as shown in FIGURE 4. Each of the legs 16 has a plurality of stepped portions 17 to provide a spacing 18 within each of the links 14 which is relatively narrow at the base portion 15 and which becomes progressively wider at the opposite end thereof. The stepped portions 17 of each link are constructed substantially parallel to each other and to the direction of movement of the belt as shown in FIGURES 3 and 4. Preferably, the legs 16 of each link include at least three stepped portions to form a link having a relatively narrow portion 21 adjacent the base portion 15, an intermediate wider portion 22 and a relatively wide portion 23 at the opposite or open end. It is to be understoood, however, that the links may be constructed with as many stepped portions as desired. The legs 16 are provided with a pair of aligned rod openings 24 near their outer ends and a pair of aligned rod openings 25 adjacent their base portion 15. It is to be noted that the openings 25 are substantially slotted along the legs 16 in the normal direction of belt travel.

As shown in FIGURE 1, the connecting links 14 are arranged in partially nested or telescoped relation with the inner ends of respective ones of each link being received within the wider ends of the adjoining links in each of the rows of links at the opposite edges of the belt. Thus the outer wider ends of the legs 16 of each connecting link 14 overlap the base or inner end 21 of the adjoining link so that the rod openings 24 in one link are aligned with the rod openings 25 in the adjoining link. The thus aligned openings 24 and 25 receive the ends 19 of the rods 12 to connect the rods together. The connecting links 14 and the rod ends 19 define spaces between the legs 16 of the links to provide sprocket receiving openings to permit the belt to be driven.

It is to be noted that each of the legs 16 may be provided with a boss 26 surrounding each of the openings 24 to provide a greater bearing surface for rods 12. Preferably, each link 14 is rigidly secured to one of the rods 12 at the openings 24, although if desired, the links may be loosely connected to one of the rods 12 at the openings 24. In the event the belt is constructed with the links loosely connected to the rods 12 at the openings 24, any suitable means may be provided on the rods to retain the links in place at the ends of the rods. It is to be noted that the ends 19 of the rods 12 are loosely received in the slotted openings 25 to permit the links to be relatively free to approach each other a distance equal to a substantial portion of the lengths of the links. Means are also provided to retain the links 14 against longitudinal displacement relative to the rods 12. Thus, as shown in the drawings, the extremities of the rods 12 are upset as indicated at 27 to prevent the links from sliding off the ends of the rods.

By constructing the legs of the links 14 with slotted openings in one end thereof, the links are relatively free to approach each other a substantial distance, thus making the belt collapsible. Moreover, the stepped link construction provides a means for constantly maintaining lateral stability in the belt in that the intermediate portions of each of the links fit in close sliding relation with the relatively wide end portions of the adjoining links at all times during relative movement of the links. Thus the stepped link construction permits a greater degree of collapsibility of the belt while still maintaining lateral stability to a greater degree than other types of conveyor belts heretofore available.

As previously described, the links are arranged in a pair of rows at opposite ends of the rods 12, thus leaving the central portions of the rods 12 free to function as conveying surfaces. It is desirable that the unsupported central conveying portion of the rods 12 be relatively wide and that the connecting links 14 be relatively narrow so that a maximum width of the belt may be employed for conveying. Preferably, the links 14 should not provide conveying surfaces because they define narrow crevices therebetween in which food or other matter being conveyed can lodge and be removed only with great difficulty. In that event, the belt will be difficult to clean and conditions of operation may be unsatisfactory.

The belt of the present invention is adapted for travel in a horizontally curved as well as straight path due to the fact that the links on either edge of the belt may collapse one within the other as the belt travels around a curved path. As shown in FIGURE 3, the ends of the rods on the inside of the curve are more closely spaced than the ends of the rods on the outside of the curve as the belt travels through a curved path. Similarly, the connecting links 14 on the inside of the curve nest to a greater degree than the links on the outside of the curve.

Although the present invention has been illustrated and described with reference to a preferred specific embodiment, it will be understood that various modifications may be made by persons skilled in the art without departing from the spirit of the invention which is defined solely by the appended claims.

I claim:

1. A conveyor belt comprising
   a plurality of spaced rods extending transversely of the path of movement of said belt,
   a plurality of connecting links disposed in a pair of spaced rows at the opposite ends of said rods, said links slideably interconnecting said rods to permit the collapse of either side of the belt during travel around horizontal curves,
   each of said links having a base portion and a pair of spaced legs rigidly connected to the outer ends of said base portion,
   each of said legs having a plurality of stepped portions parallel to said path, the stepped portions on opposing legs being spaced apart a relatively narrow distance at said base portion and a relatively wide distance at the opposite end thereof,
   said links being arranged in partially nested relation with narrower stepped portions of respective ones of said links being received in closely fitting sliding relation within the wider stepped portions of adjoining links,
   the inner surfaces of said wider stepped portions having a substantial straight length ahead of the adjoining outer surfaces of said narrower stepped portions and said outer surfaces having a substantial straight length behind said inner surfaces when the belt is in normal position for straight travel to permit said outer surfaces to slide forward within said inner surfaces when the belt collapses for curved travel,
   and means to retain said links against lateral displacement relative to said rods.

2. A conveyor belt according to claim 1 wherein said legs have three stepped portions and an intermediate portion in each link is received within an outer portion in the adjoining link.

3. A conveyor belt comprising:
   a plurality of spaced rods extending transversely of the path of movement of said belt,
   a plurality of connecting links disposed in a pair of spaced rows at the opposite ends of said rods, said links slideably interconnecting said rods to permit the collapse of either side of the belt during travel around horizontal curves,
   each of said links having a base portion and a pair of spaced legs rigidly connected to the outer ends of said base portion,
   each of said links having a pair of aligned rod openings adjacent each end of said legs, at least one pair of said openings in at least some of said links being substantially slotted in the normal direction of belt travel, the ends of said rods extending through the aligned pairs of said openings in adjoining links so that said links pivotally connect said rods at their opposite ends,
   each of said legs having a plurality of stepped portions parallel to said path, the stepped portions on opposing legs being spaced apart a relatively narrow distance at said base portion and a relatively wide distance at the opposite end thereof,
   said links being arranged in partially nested relation with narrower stepped portions of respective ones of said links being received in closely fitting sliding relation within the wider stepped portions of adjoining links,
   the inner surfaces of said wider stepped portions having a substantial straight length ahead of the adjoining outer surfaces of said narrower stepped portions and said outer surfaces having a substantial straight length behind said inner surfaces when the belt is in normal position for straight travel to permit said outer surfaces to slide forward within said inner surfaces when the belt collapses for curved travel,
   and means to retain said links against lateral displacement relative to said rods.

4. A conveyor belt as defined in claim 3 wherein each of said links is rigidly secured to one of said rods.

5. A conveyor belt as defined in claim 3 wherein said rows of links are relatively narrow and the central portions of said rods between said rows are relatively wide to provide conveying surfaces substantially wider than said rows.

References Cited by the Examiner

UNITED STATES PATENTS 2,872,023  2/1959  Bechtel _____ 198—182
3,127,980  4/1964  Lanham _____ 198—195

SAMUEL F. COLEMAN, *Primary Examiner.*

WILLIAM B. LA BORDE, *Examiner.*